United States Patent [19]

Diersing et al.

[11] 4,251,851
[45] Feb. 17, 1981

[54] PANELBOARD ASSEMBLY

[75] Inventors: Raymond A. Diersing, Mexico, Ind.; Wilhelm T. Hackenbroch, Cedar Rapids, Iowa; George E. Schweikle; Harris I. Stanback, both of Lexington, Ky.

[73] Assignee: Square D Company, Palatine, Ill.

[21] Appl. No.: 943,081

[22] Filed: Sep. 18, 1978

Related U.S. Application Data

[62] Division of Ser. No. 842,432, Oct. 17, 1977, Pat. No. 4,142,225.

[51] Int. Cl.³ .............................................. H02B 1/04
[52] U.S. Cl. ................................. 361/363; 361/361; 361/353
[58] Field of Search .................. 174/148, 149, 156; 361/346, 353, 355, 356, 358, 359, 361, 363; 339/22 B; 200/293, 294, 295

[56] References Cited

U.S. PATENT DOCUMENTS

| 4,038,585 | 6/1977 | Wolski | 361/355 |
| 4,093,970 | 6/1978 | M'Sadoques | 361/355 |
| 4,142,225 | 2/1979 | Diersing | 361/361 |

Primary Examiner—Gerald P. Tolin
Attorney, Agent, or Firm—Larry I. Golden; Norton Lesser; Richard T. Guttman

[57] ABSTRACT

The following specification describes a panelboard assembly comprising a plurality of modular insulators each having an integrally formed resilient bead for engaging a circuit breaker housing recess to support a circuit breaker. A tongue on each insulator assists in disengaging the circuit breaker from the bead. Longitudinally extending bus bars are supported by the insulators in heat transmitting relationship to the metal wall of an enclosure. The insulators have long surface paths between adjacent bus bars and bus stabs to prevent electrical leakage. A neutral assembly in close space saving relationship to the bus bars and for convenient wiring is provided together with partition walls between phase bus bars and between individual bus stabs.

14 Claims, 21 Drawing Figures

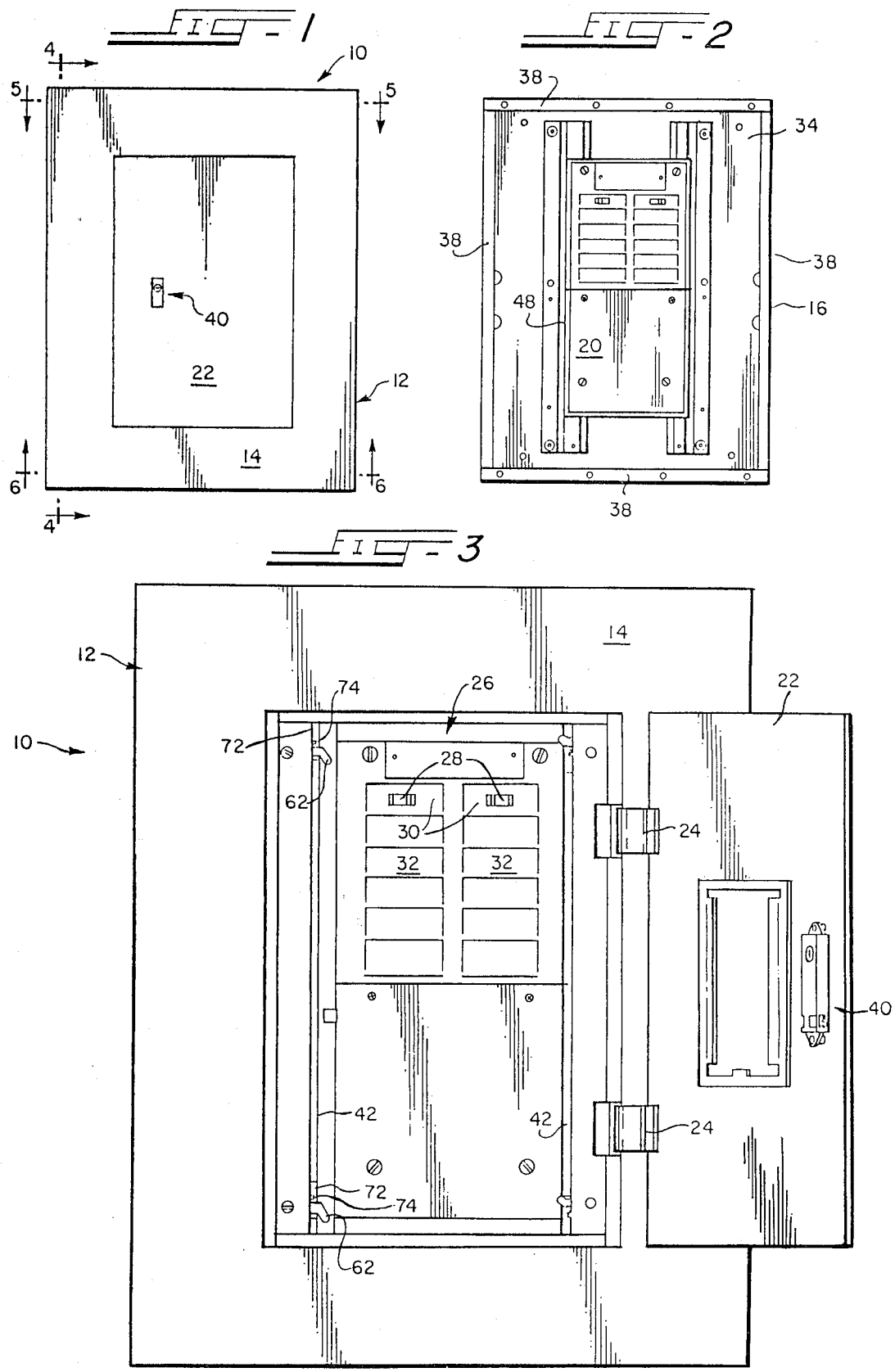

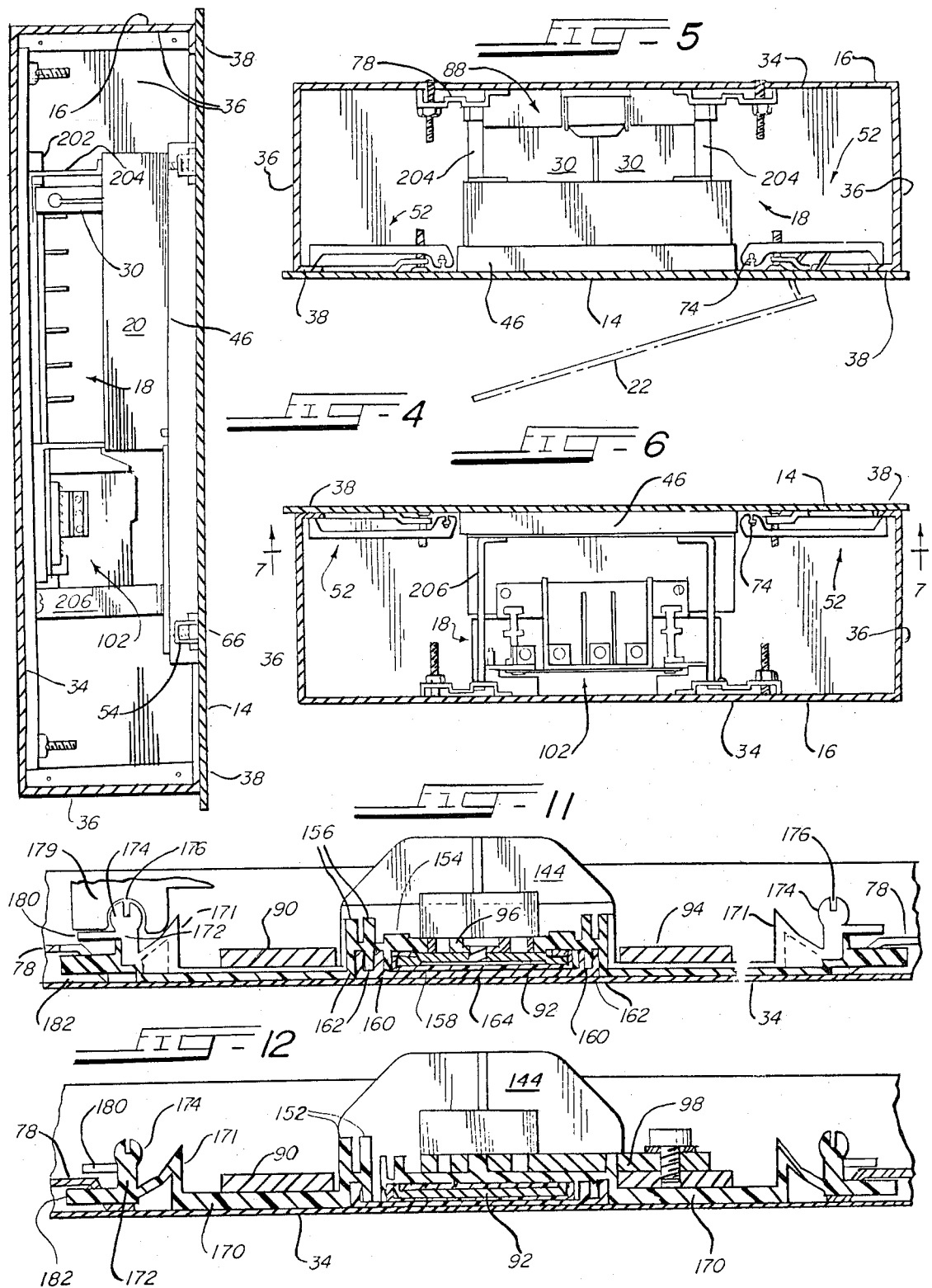

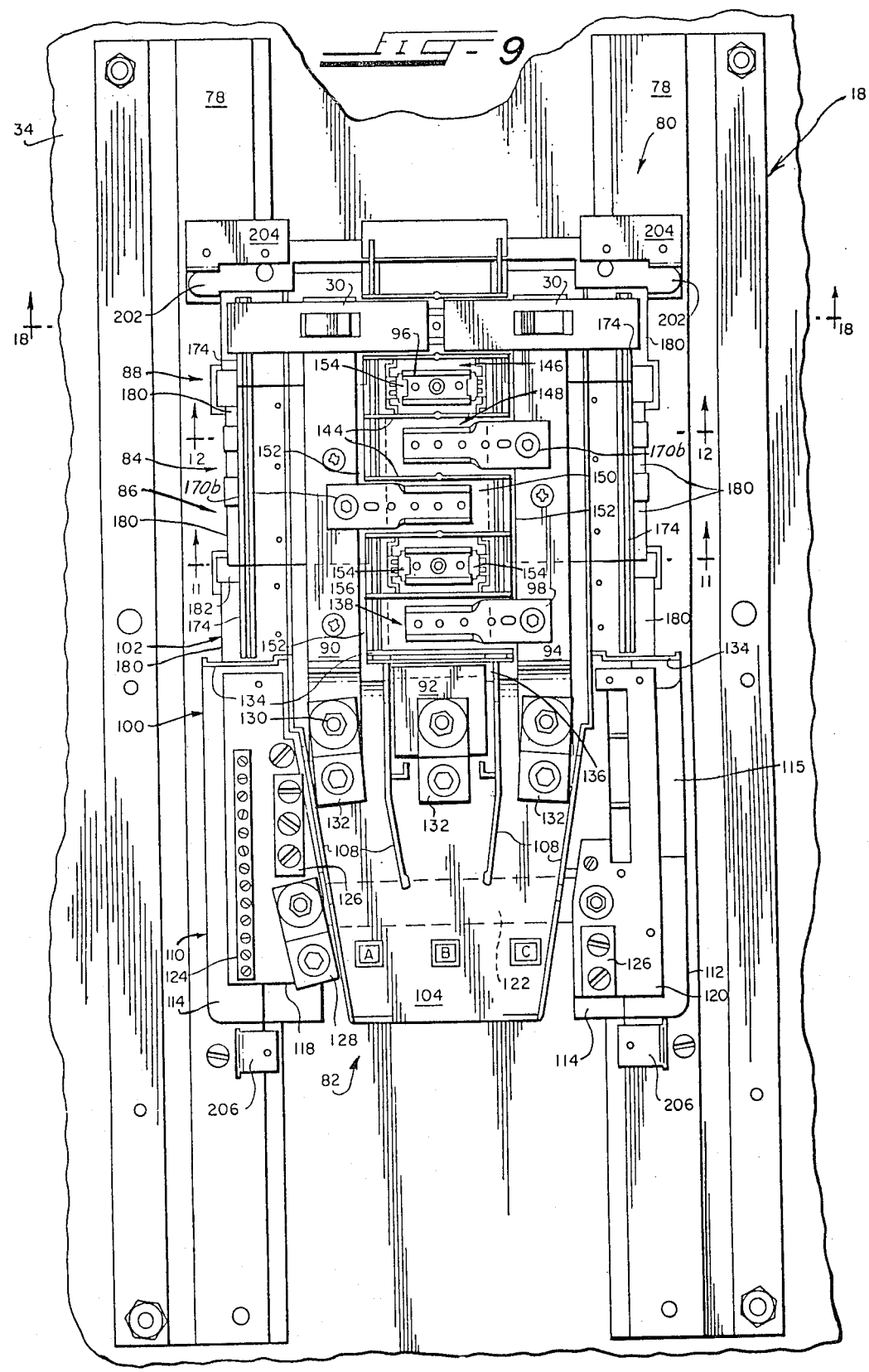

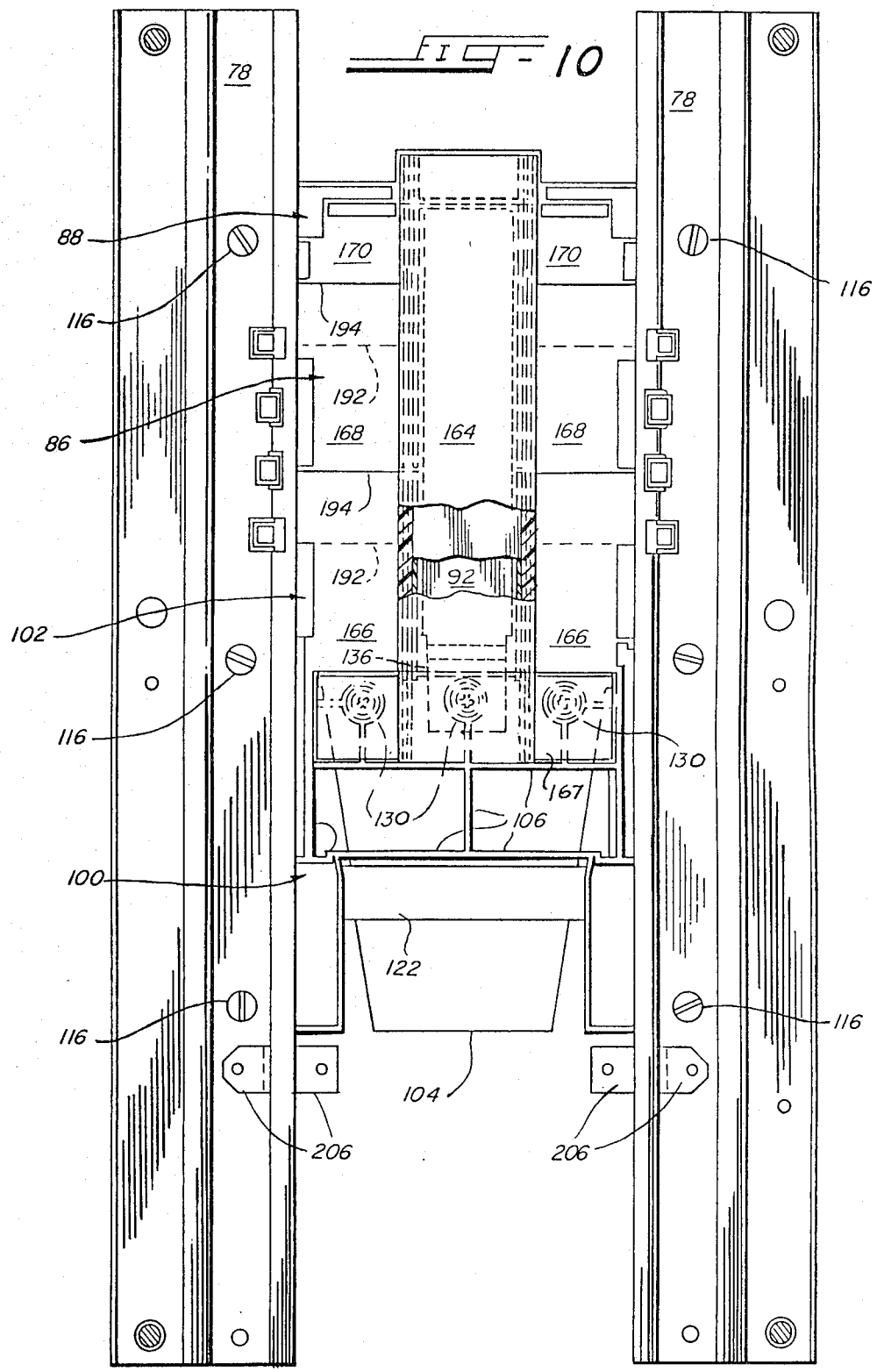

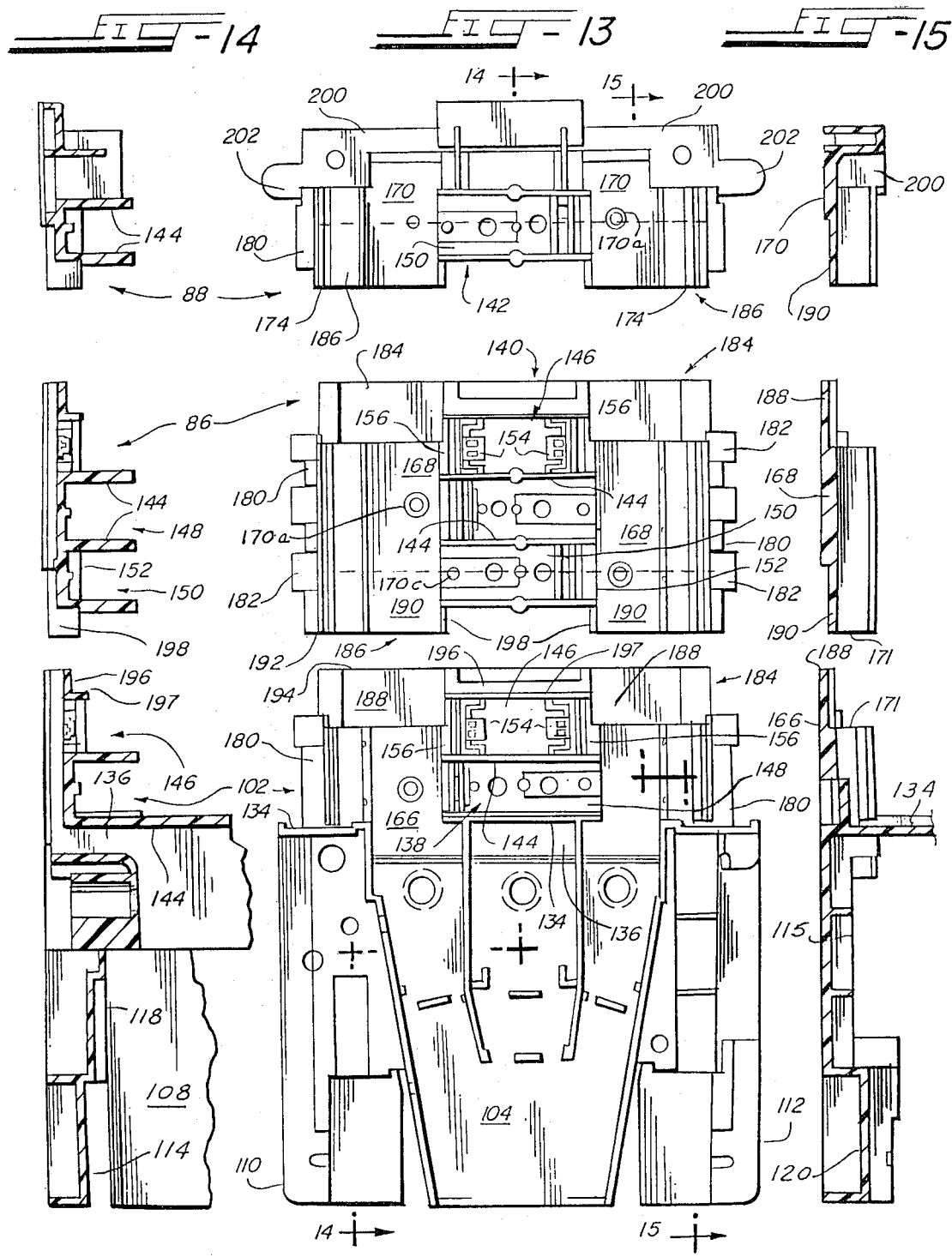

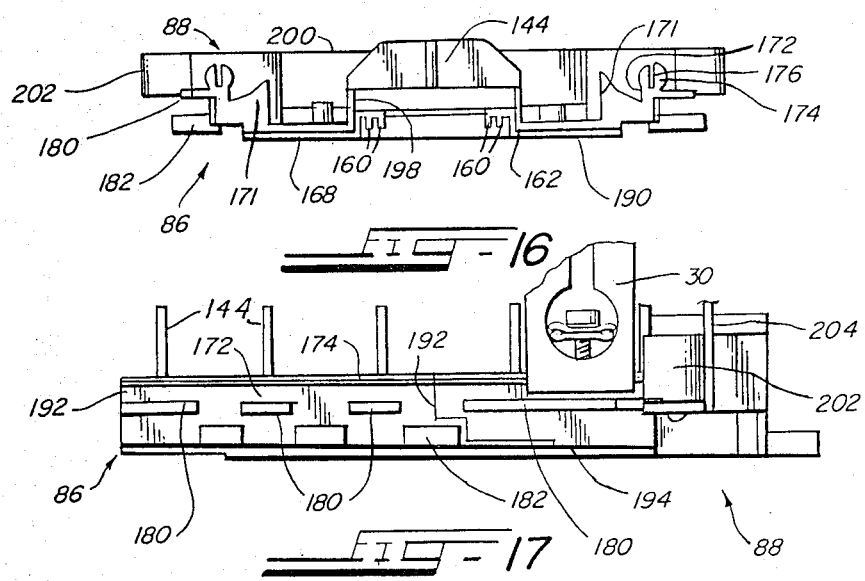

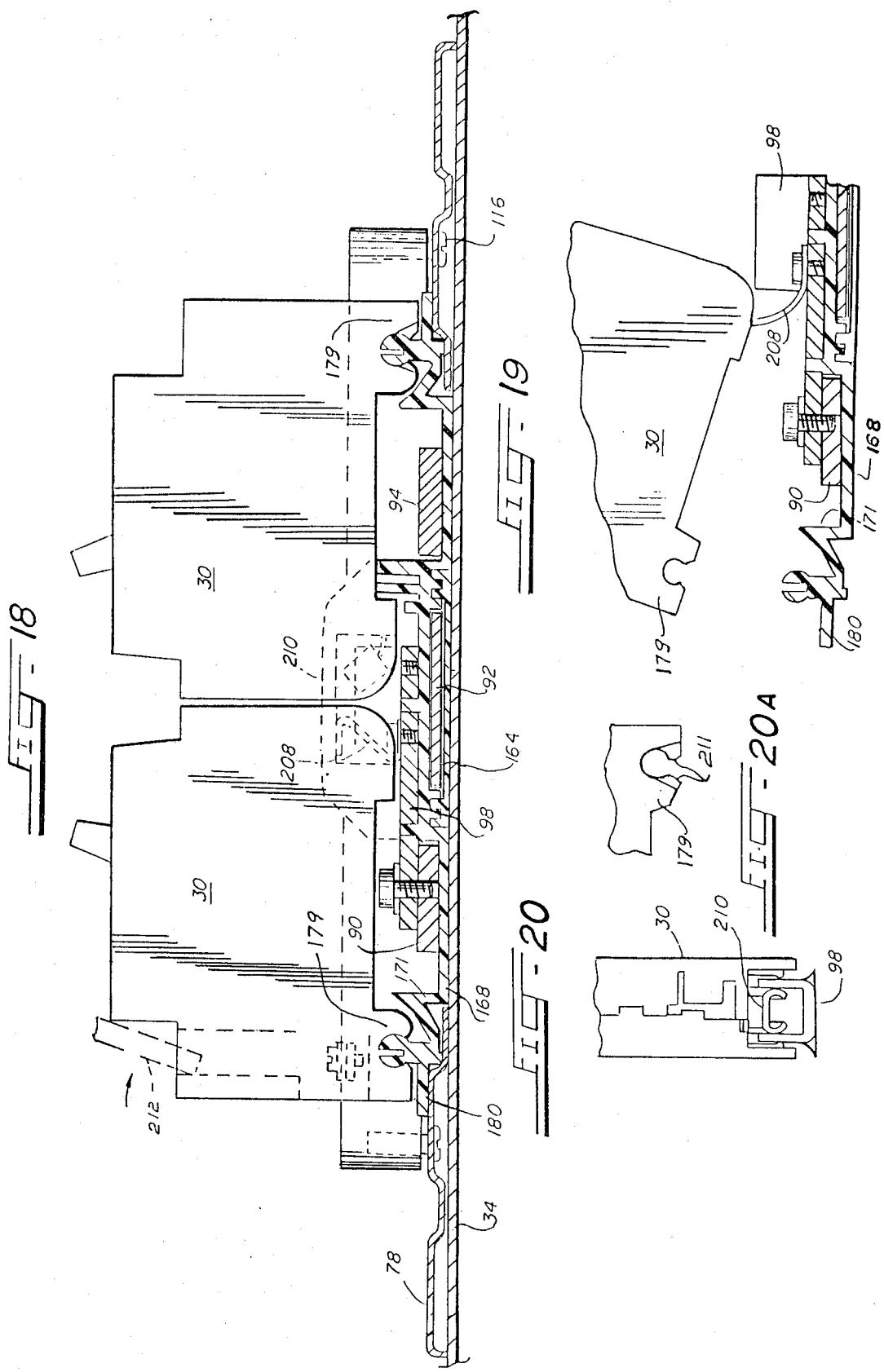

PANELBOARD ASSEMBLY

This is a division of application Ser. No. 842,432, filed Oct. 17, 1977, now U.S. Pat. No. 4,142,225.

BACKGROUND OF THE INVENTION

1. Field of the Invention

This invention relates in general to panelboard assemblies and more particularly to an improved and more economical panelboard assembly and to a circuit breaker.

2. Summary of the Prior Art

In a typical panelboard assembly such as shown in U.S. Pat. Nos. 3,105,173, 3,134,050 and 3,173,063, the bus bars are spaced from a U shaped sheet metal mounting pan and the back metal wall of the enclosure supporting the pan by a relatively large distance. Insulating materials usually formed of a thermosetting plastic requiring a relatively thick section are used to support the bus bars.

Circuit breakers, which connect the bus bars to the various circuits through a bus stab or branch connector extending from a respective bus bar, carry a metal mounting clip adjacent one end of the circuit breaker housing for supporting the circuit breaker on a longitudinally extending bead formed on each side leg of the mounting pan. The end of the circuit breaker opposite the mounting clip has a terminal for connection to a bus stab and a respective bus bar.

The spacing of the bus bars from the walls of the metal enclosure does not take advantage of the heat dissipation qualities of the metal enclosure, while the use of the metal mounting pan and spring clip on the circuit breaker to secure it to the mounting pan bead or rail adds to the cost.

SUMMARY OF THE INVENTION

The present invention provides a panelboard assembly of novel design having an interior assembly formed from a plurality of thermoplastic insulators or bases of modular design for use in high voltage high current electrical systems. The modular bases can be conveniently assembled to bus bars of selected length and to a pair of elongate rail members adjacent the outer edges of the bases to form an interior assembly for convenient mounting in an enclosure.

The insulators have a longitudinally extending integrally formed resilient bead adjacent the outer edges and the bead is snap fittingly received in a simple recess in each circuit breaker housing to support the housing. A tongue on the insulators is engaged by a corner of the circuit breaker housing for enabling the circuit breakers to be easily freed from the panelboard assembly. An elongate rib adjacent the bead serves to prevent the mounting of improper circuit breakers and assists in rigidifying a rib on which the bead is formed.

The insulators include two spaced thin wall portions contiguously engaged with the back metal wall of the box supporting the panelboard and a thin central rib portion spaced from the metal wall. The two thin wall portions are in contiguous engagement with a respective outer bus bar so that the outer two bus bars are in close heat transmitting relationship to the metal enclosure or box. A center bus bar located intermediate the outer bars is sandwiched between one face of the central rib of the insulators and the metal wall of the enclosure. A thin insulating wrap or wall is engaged between the center bus bar and the metal wall of the enclosure and serves to provide good heat transmission. The bus stabs for connecting the bus bars to the circuit breakers are located along the other face of the central rib which is provided with spaced openings for the connecting bus stabs to the center bus bar.

The ends of the insulators are formed with overlapping thin wall sections for nested engagement with each other to provide long surface paths at the junctures to guard against electrical leakage. Additionally tortuous surface paths are provided to prevent electrical leakage from the bars and from the bus stabs.

Partition walls are also located between the bus bars and between the buses of the neutral assembly and also between adjacent bus stabs or branch connectors to thereby provide required safety and extend any surface path against electrical leakage.

It is therefore among the primary objects of the present invention to provide an improved and/or more economical panelboard assembly.

It is another object of the present invention to provide an improved and/or more economical interior assembly for a panelboard.

It is still another object of the present invention to provide an improved and/or more economical modular base assembly for a panelboard.

It is yet another object of the present invention to provide an improved and more economical circuit breaker housing.

Other objects and features of the present invention will become apparent on examination of the following specification and claims together with the drawings.

BRIEF DESCRIPTION OF THE DRAWINGS

FIG. 1 is a front elevational view of a panelboard assembly incorporating the principles of the present invention.

FIG. 2 is a front elevational view of the panelboard assembly shown in FIG. 1 with the cover removed.

FIG. 3 is a front elevational view of the panelboard assembly shown in FIG. 1 with the door in open position.

FIG. 4 is a sectional view taken along the line 4—4 in FIG. 1.

FIG. 5 is a sectional view taken along the line 5—5 in FIG. 1.

FIG. 6 is a sectional view taken along the line 6—6 in FIG. 1.

FIG. 9 is a front elevational view of the interior assembly incorporating the principles of the present invention.

FIG. 10 is a rear elevational view of the interior assembly shown in FIG. 9.

FIG. 11 is a sectional view taken along the line 11—11 in FIG. 9.

FIG. 12 is a sectional view taken along the line 12—12 in FIG. 9.

FIG. 13 is an exploded front elevational view of the modular base assembly.

FIG. 14 is a sectional view taken along the line 14—14 in FIG. 13.

FIG. 15 is a sectional view taken along the line 15—15 in FIG. 14.

FIG. 16 is an end elevational view of the center and end modular bases.

FIG. 17 is a side elevational view of the assembled center and end modular beads.

FIG. 18 is a sectional view taken along the line 18—18 in FIG. 9.

FIG. 19 is a partial sectional view illustrating a circuit breaker in partially removed position.

FIG. 20 is a partial end view of a circuit breaker illustrating the jaw assembly therein engaging a connector, and FIG. 20a is a fragmentary side elevational view of a circuit breaker housing cutout portion.

DESCRIPTION OF THE PREFERRED EMBODIMENT

Figure 7:
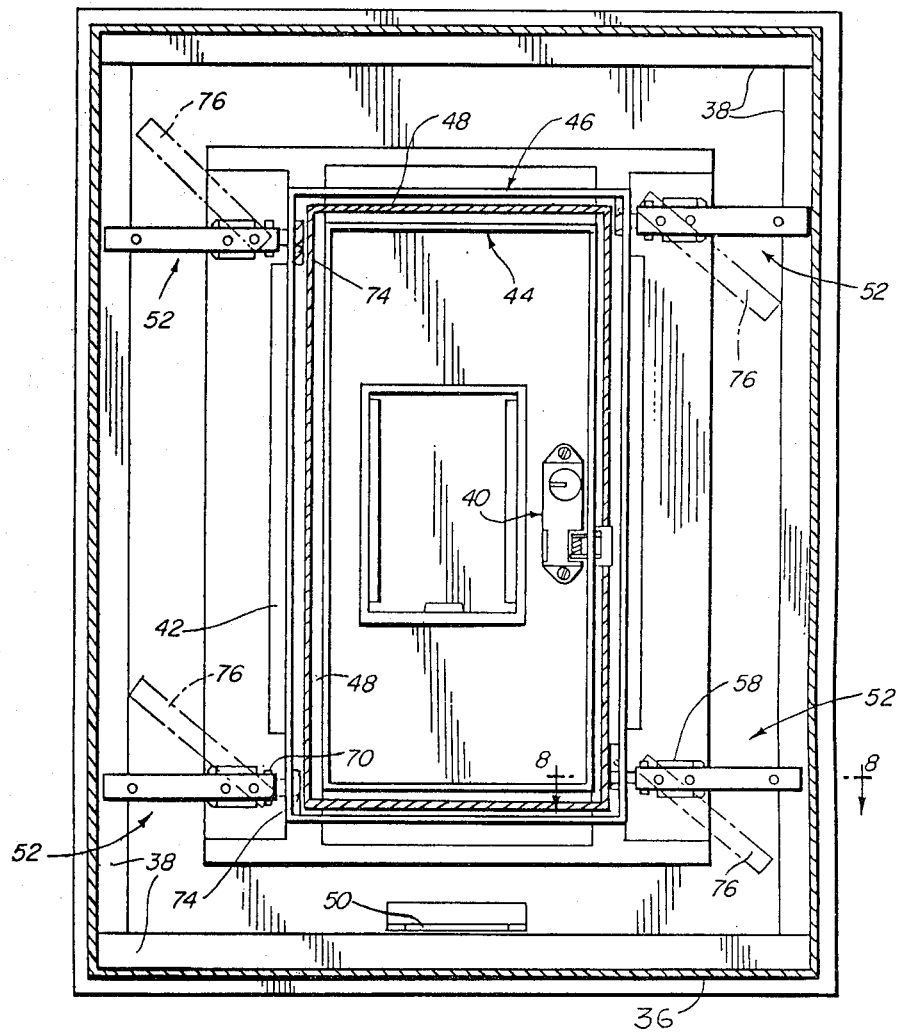
FIG. 7 is a sectional view taken along the line 7—7 in FIG. 6.
Figure 8:
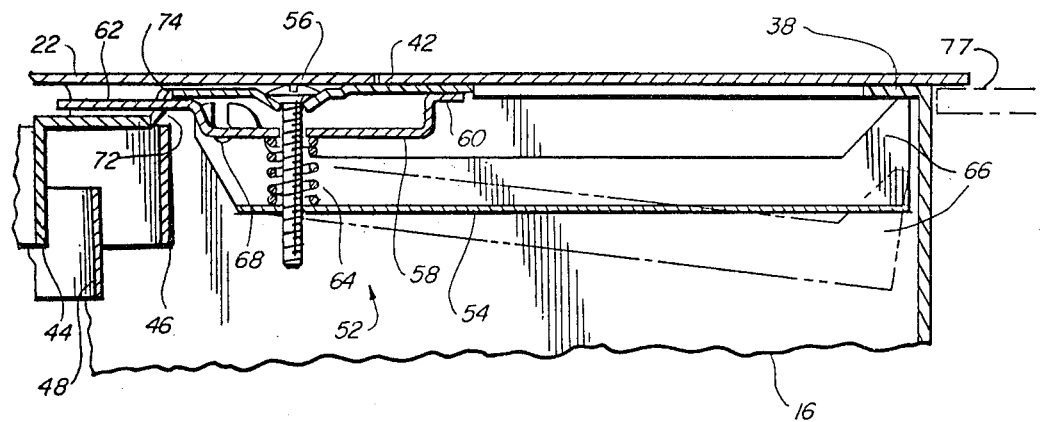
FIG. 8 is a sectional view taken along the line 8—8 in FIG. 7.

Referring now more specifically to the drawings, a panelboard assembly for use with 277/480 volt A.C. 3 phase 4 wire systems and lower voltage systems is indicated in FIGS. 1 and 3 by the reference character 10. The panelboard assembly 10 includes an enclosure or housing 12 having a cover 14 overlapping a cabinet or box 16 seen in FIG. 2, which carries an interior assembly 18 best seen in FIG. 9 covered by an interior trim assembly 20. The interior trim assembly or hopper 20 in turn is hidden or overlapped by a door 22 supported by conventional hinge assemblies 24 on the cover 14 for movement between a closed position and an open position to provide access through opening 26 to the handles 28 of respective circuit breakers 30. The circuit breakers may be of a plug-on type utilizing a spring clip terminal or may be of a bolt-on type and are capable of interrupting 14,000 RMS symetrical amps at 277/480 volts or 65,000 amps at 120/208 volts. The bolt-on type circuit breaker may utilize a flexible strap terminal as for example disclosed in application Ser. No. 748,607 filed by Erickson. The handles 28 project through respective passages in the interior trim assembly 20, which passages are closed by removable plates 32, if the corresponding circuit breaker position is not in use.

The cabinet or box 16 comprises a back wall 34 from which transverse top, bottom and side walls 36 project as best seen in FIGS. 4, 5 and 6. The back wall 34 is fixed or secured to a supporting wall or member in a conventional manner and the walls 36 are provided with conventional knockouts enabling the passage of appropriate wiring contained in the conduits or gutters secured to the box 16. Each of the walls 36 is also provided with an inwardly projecting lip or flange 38 parallel to and spaced from the back wall 34 as best seen in FIGS. 4, 5 and 6 to define an opening permitting removal of the interior trim assembly 20 and connection of the conduit wiring when the cover 14 is removed.

The door 22 carries a spring biased retractable latch assembly 40 for engagement with a keeper formed on one of a plurality of flange walls 42 secured to the interior or rear surface of cover 14 to latch the door in a closed position. The flange walls 42 at their inner edge each have a rearwardly extending lip to define an annular rabbet 44 as best seen in FIG. 7. Rabbet 44 is spaced inwardly from or encircled by a second annular rabbet 46 formed on a flange wall secured to the rear surface of flange walls 42. The rabbets 44 and 46 serve to nestingly receive an outwardly projecting flange wall 48 on interior trim assembly 20 as explained in U.S. Pat. No. 4,162,517.

A cover flange 50 secured to the rear surface of cover 14 and resting on the lower horizontal lips 38 of box 16 serves to properly position and hold the weight of the cover 14, while the cover together with the door are secured to the box 16. The cover 14 is secured to the box 16 by means of a plurality of spaced latch lever clamp assemblies 52 which capture a respective side or vertical lip 38 between the clamp assembly 52 and cover 14.

The latch lever clamp assemblies 52 as explained in U.S. Pat. No. 4,131,932 each includes a U-shaped elongate clamp 54 by a respective screw 56. Each screw 56 passes through a side flange wall 42 and a lever 58 for threaded engagement with the back leg of the U-shaped clamp 54 adjacent one end of the clamp. The lever has spaced L-shaped legs 60 and 62 rotatably engaged with the rear surface of the side flanges 42. A coil spring 64 encircling screw 56 is located between the back leg of clamp 54 and lever 58 to bias the opposite or free end of the clamp side legs rearwardly from the cover 14. The free end of the clamp side legs each have a projection 66 extending toward the cover 14 for engagement against the rear surface of the respective side lip or flanges 38 to secure the cover 14 to the box 16 when the screw 56 is tightened.

An enlarged arcuate recess 68 is formed in each clamp side leg for receiving a respective ear 70 of the lever 58, which passes between the clamp side legs. The clamp 54 and lever 58 can therefor rotate together about the axis of screw 56 and clamp 54 together with screw 56 can pivot relative the general plane of the lever 58 and cover 14.

The leg 62 on the lever 58 projects through a respective elongate passage 72 formed in the side flanges 42 and provides a visual indication of the angular position of the clamp 54. A detent 74 extends from each side flange 42 intermediate the ends of each passage 72 for engagement with leg 62, when moved between ends of the passage 72.

To assemble the cover 14 to the box 16 as explained in the Brumfield application, each screw 56 is loosened, permitting each tab 62 and the respective clamp to be manually rotated from alignment with a horizontal axis and the clamp projection 66 is spaced from cover 14. The detent 74 engaged with a respective tab 62 holds each clamp in the position indicated by broken lines 76 in FIG. 7 with the clamps spaced from the edges of cover 14 since the radial distance between screw 56 and clamp ends 66 is less then the distance to flanges 38 in the angular position indication at 76. The cover may now be placed in position with rabbets 44 and 46 nestingly receiving the flange wall 48 of the interior trim assembly and flange 50 resting on the bottom lip 38. Each tab 62 may now be rotated to in turn rotate the respective lever 58 and the clamp 54 into a horizontal position with the projections 66 located behind and in alignment with the side or vertical lips 38 of the box 16. The screws 58 are then tightened to draw the projections 66 on clamps 54 toward the cover 14 against the bias of springs 64 for snugging the cover against flanges 38 or an adjacent wall portion 77.

The interior assembly 18 as best seen in FIGS. 9-18 includes a pair of elongated ribbed or corrugated rails or members 78 secured in engagement with back wall 34, together with modular base assembly 80 secured to and bridging the rails 78 to form a unitary assembly. The modular base assembly 80 comprises a main terminal and neutral assembly 82, an insulator base assembly 84 having a plurality of modular base insulators 86 and 88 formed of a thermoplastic material and a plurality of spaced bus bars 90, 92 and 94 having a generally rectangular cross section to which respective U-shaped bus stabs or branch connectors 96 and 98 are secured for connecting each bus bar to respective circuit breakers 30. The bus stabs 96 and 98 are of a type described in U.S. Pat. No. 4,153,318 arranged for receiving either a plug-on type or bolt-on type circuit breaker.

The assembly 82 comprises an insulating member or base 100 having a modular insulator portion 102 formed at one end in coplanar engagement with modular insulator 86 and a planar platform wall 104 at the other end spaced from the cabinet back wall 34 and the general plane of portion 102. The insulating member 100 and insulators or bases 86 and 88 are each formed of a high strength thermoplastic material having desired heat transmitting and electrical properties. A polyphenyl oxide material sold by General Electric under the name Noryl is one example of such material.

Transverse strengthening ribs 106 extend from the platform wall 104, as best seen in FIG. 10, for engagement with the cabinet back wall 34. Similar ribs intermediate the ends of member 100 and each overlapped by a respective bus bar integrally interconnect the platform wall 104 with the modular portion 102.

The wall 104 is in the form of a truncated triangle having edges converging toward the end of member 100 opposite portion 102 and a transverse partition wall 108 is provided for wall 104 along each converging edge and intermediate the bus bars 90, 92 and 94 to prevent inadvertent contact with the bars. Respective side walls 110 and 112 are integrally interconnected with the portion 102 and with wall 104 and extend adjacent opposite converging edges of wall 104.

Walls 110 and 112 each have stepped planar wall portions 114 spaced from the back wall 34 with the outer higher step overlapping a respective rail 78. The lower step extends into the space between the converging edges of wall 104 and the rails. Wall 112 is also provided with a second stepped planar wall portion 115 spaced adjacent the portion 104 for engagement with the respective rail. Ribs extending from the stepped wall portions 114 engage the cabinet back wall and the rails to rigidify the assembly. Each side wall 110 and 112 and insulator 88 is provided with bosses for threaded engagement with respective screws 116 passing through the rails to secure the assembly 80 to the rails 78 and the upper step of portions 114 are provided with a slightly raised planar rib for engaging the lower surface of a respective neutral bus 118 and 120.

Each neutral bus 118 and 120 is secured to a respective side wall 110 and 112 and interconnected by a metal crossover bar or strap 122 extending below the platform wall 104 and above the lower step of wall portions 114. Screws are located in a metal base 124 secured to bus 118 and appropriate neutral terminals 126 and a neutral lug 128 are carried by buses 118 and 120 to facilitate the extension of neutral connections for the various circuits and the cabinet. The buses 118 and 120 together with the crossover bar 122, terminals 126 and lug 128 form a separate assembly, which is faciley secured to walls 110 and 112, as a unit, which may include base 124. The ends of the various threaded elements securing the terminals and buses to each other are received by locating recesses of the side walls 110 and 112 and in the space defined by the upper step of wall portions 114.

The ends of the bus bars 90, 92 and 94 are secured to wall 104 by a respective fastener 130 together with a respective main lug 132. Each main lug 132 has a cantilever terminal resting on a stop on wall 104 for extending an individual connection to the respective bus bar. Spaced upstanding partition walls 134 transverse to walls 104 and 112 are also provided intermediate the portion or insulator 102 and the walls 104, 110 and 112 for each bus 92, 118 and 120 to prevent inadvertent engagement.

The bars 90, 92 and 94 are each provided with a trasverse or right angle bend adjacent the juncture of wall 104 and portion 102 so that the bars extend toward the rails and the portion 102, which is spaced from wall 104 and adjacent the cabinet rear wall. A second transverse or right angle bend extends the bars parallel to the elongate axis of the rails. The first bend in bar 92 extends the bar through a passage 136 formed between the respective wall 134 and the end of wall 104. The second bend in bar 92 extends the bar beneath a central raised rib section 138 on portion or insulator 102.

Section 138 is coincident with and aligned with similar central rib sections 140 and 142 on insulators 86 and 88. The rib sections 138, 140 and 142 overlap the center bar 92, which is located adjacent the cabinet back wall 34, and each section 138, 140 and 142 is provided with spaced upstanding transverse partition walls 144 to define compartments 146, 148 and 150 spaced along the central longitudinal axis of the mounting pan assembly in which respective branch connectors 96 and 98 are located. The partition walls prevent inadvertent contact with the connectors and provide long surface paths to guard against electrical leakage.

The rib sections of compartments 148 and 150 comprise a planar wall parallel to and spaced from the cabinet back wall for supporting a respective connector 98 in overlapping insulating relationship to bar 92. Locating lugs are provided on the planar walls of compartments 148 and 150 for engaging corresponding passages in the back leg of a respective U-shaped bus stab or connector 98 to properly position the connectors.

Adjacent connectors 98 extend into the compartments 148 and 150 from opposite side or outer bus bars 90 and 94. A pair of adjacent barrier ribs or walls 152 are formed along one edge of compartments 148 and along the opposite edge of compartment 150 to prevent entrance of a connector into the compartment from a bus bar 90 or 94 adjacent the respective barrier walls 152. This ensures that adjacent connectors 98 cannot extend from the same bus bar into adjacent ones of compartments 148 and 150 and also forms a tortuous path increasing the surface distance to an adjacent bus bar to provide the equivalence of a 2" surface gap, and 1" airgap, as required for panelboards utiized in the described system.

The compartments 146 are located intermediate compartments 148 and 150 and each comprises a pair of spaced ribbed walls 154. Each wall 154 extends toward the center of the compartment from a respective one of a pair of side barrier walls 156 aligned with walls 152. The free ends of walls 154 are spaced apart and have projecting ends configured for nestingly engaging a corresponding recessed configuration at opposite ends of U-shaped bus stabs or connectors 96, which seat between the free ends of walls 154. Connectors 96 are secured to a respective raised portion of the center bus bar 92 passing therebelow and spaced in alignment with compartments 146. Walls 154 and 156 thus also serve to increase the surface distance between the bus stabs and adjacent bars to provide a large electrical resistance therebetween.

The bus bar 92 passes between the central rib sections 138, 140 and 142 and the cabinet back wall with a flexible insulating wrap 158 of approximately 0.005" mylar, for example encircling bar 92 having a double thickness adjacent the back wall 34. The spaced raised portions of bar 92 project through openings in the wrap 158 into compartments 146 for engagement with respective connectors 96. The bus bar 92 is located between a pair of elongate ribs 160 projecting below each central rib section 138, 140 and 142 to confine the wrap during assembly. A second pair of spaced parallel ribs 162 is provided for each rib 160 for snap fittingly receiving spaced parallel pair of resilient edge lips of an insulating cap 164. The ribs 160 and 162 serve to increase the surface distance between bus bar 92 and adjacent metal portions to provide the equivalence of a 2" surface gap and 1" airgap, as required for such panelboards.

The outermost one of the ribs 162 on opposite sides of bar 92 extends to a level coincident with the back leg of cap 164 and the back wall 34. A generally planar side wall 166, 168 and 170 in engagement with wall 34 is integrally formed on the outermost ones of ribs 162 of respective insulators 102, 86 and 88 and each extends toward a respective rail 78.

Bus bars 90 and 94 are in engagement with the upper planar surface of aligned insulating side walls 166, which are less than ⅛" for effective heat transmission to the back wall 34. Locating bosses 170a seen in FIG. 13 on selected side walls 166, 168 and 170 are received in respective openings of the bus bars 90 and 94 and screws in the bosses serve to fasten the bus bars to the insulators. The bars 90 and 94 in turn also have holes in alignment with respective compartments 148 and 150 at which the connectors 98 are secured. The connectors 98 are secured to the bars by means of a respective screw 170b (seen in FIG. 9) passing through a tap portion extending from the back walls of the respective U-shaped connector 98. In addition the planar wall 150 supporting each connector 98 is provided with locating bosses such as 170 (seen in FIG. 13) received by the connector 98.

The side walls 166, 168 and 170 each have an elongate aligned transverse integrally formed wall 171 seen in FIGS. 11, 12 and 18 located adjacent a respective rail edge. The wall 171 extends perpendicularly outwardly of the side walls and then angularly toward the respective rail to overlap the rail and prevents the introduction of an improperly shaped and sized circuit breaker. An elongate transverse or upstanding circuit breaker mounting rib 172 is integrally formed on the angular portion of wall 171 overlapping the rails and the rib 172 extends parallel to and adjacent the respective rail inner edge. The ribs 172 are in alignment and provided with an elongate enlarged rail or bead 174 at the upper or free end having an arcuate outer periphery and an elongate central split or recess 176. The bead 176 is resiliently snap fit in aligned arcuate cutouts formed in a depending portion 179 of each of the two half portions defining the insulating housing of each circuit breaker 30.

Respective lever walls or tongues 180 project from the ribs 172, in overlapping relationship to the rail with each tongue 180 partially spanning adjacent compartments 146, 148 and 150. Lower tongues 182 spaced intermediate tongues 180 are also provided on the side walls of modular insulators 102 and 86 and these tongues 182 pass through recesses or cutouts in the rails.

It will be noted that the insulators 102, 86 and 88 are of modular construction in that insulators 102 and 86 each includes end wall portion 184 adapted to nestingly engage complementary shaped wall portions 186 on an adjacent portion of insulators 86 and 88 as best seen from FIGS. 13-15.

Thus the insulator 102 includes a compartment 148 and an end compartment 146 together with side walls 166 with portion 184 projecting from the compartment 146 and walls 166. Portion 184 is initiated adjacent the central transverse axis of end compartment 146 and includes side walls 188 of reduced thickness or cross section projecting from the lower half of walls 166 for overlapped engagement by side walls 190 of reduced cross sections on portion 186 projecting from the upper half of side walls 168 on insulator 86 so that the portions engage along edges 192 and 194. It will be noted that the reduced section side walls 188 extend to the rail margin and are provided with their end flanges overlapping the rail edge. Thus the ribs 171 and 172 on insulator 102 are terminated adjacent side walls 188, while the corresponding ribs 171 and 172 on insulator 86 extends to the free end of wall 190. The end of each rib is terminated by a transverse rigidifying wall and when wall 190 is assembled to overlap wall 188 the ribs 171 and 172 form a continuous elongate base assembly. The outer barrier walls 156 of compartment 146 are similarly of reduced cross section from a position adjacent the central axis of the compartment and a shelf wall 196 of reduced cross section projects from an end wall portion 197 of reduced height and thickness for the compartment 146.

The insulator 86 at the end portion 186 engaging with portion 184 of insulator 102 is provided with an end compartment 150 having a planar wall of thin cross section complementary to shelf wall 196 and adapted to overlappingly engage the wall 196. In addition complementary barrier walls 198 project forwardly of compartment 150 for nestingly engaging the reduced section portion of the barrier walls 156 of compartment 146 on insulator 102. The end partition wall 146 of compartment 150 is recessed along the lower portion thereof for nestingly receiving the thin end wall 196 of end compartment 146.

The insulator 86 is also provided with an end portion or section 184 at the end opposite portion 186. Portion 184 on insulator 86 is formed substantially identically to that described for end portion 184 of insulator 102. Insulator 86 therefore also engages either a portion or end section 186 of a second insulator 86 or an end portion 186 of insulator 88 formed substantially identically to portion 186 on insulator 86. It will be noted that the overlapping thin sections 184 and 186 enable the insulators to be faciley securely engaged while providing a long surface path guarding against electrical leakage at their juncture.

Thus the assembly 80 may be extended to a desired length dependent on the length of the bus bars and rails, which are of course chosen in accordance with the desired number of circuit breakers to be accommodated in the panelboard.

The end insulator 88 has a single compartment 150 and an open dummy compartment, defined by rigidifying ribs and which is not used. Raised planar interconnected side walls 200 are formed on insulator 88 at the ends of walls 150 and ribs 172. Depending ribs on walls 200 engage the cabinet and rails. Projecting side bosses 202 on walls 200 enable the end insulator 88 to be fastened to the rails by respective fasteners 116.

The bosses 202 overlap apertured end flanges on respective standards 204 and the walls of the bosses engage the standards 204 to prevent rotation. Standards 204 are secured to the rearwardly offset back wall at one end of the trim assembly 20 which carries plates 32. A forwardly offset hopper wall at the other end of the trim assembly overlaps the neutral assembly 102 and a pair of standards 206 adjacent the ends of side walls 110 and 112 of the neutral assembly support the other end of the trim assembly. The standards 206 each have a tab at one end passing through correspondingly shaped openings of a respective rail to prevent rotation and are fastened to the rails. The other end of each standard 206 as another tab for fastening to the forwardly offset hopper wall of the trim assembly 20.

The bus stabs or connectors 96 and 98, as mentioned, are of a type set forth in a copending application by Bishop and Schultz and each has a generally U-shaped portion for engagment with either a plug-on type of circuit breaker employing a spring clip terminal or a flexible strap type terminal as set forth in U.S. Pat. No. 4,144,554.

The U-shaped portion of each connector has several spaced threaded openings in the back leg one of which is used for securing a flexible or foldable tab type terminal indicated at 208 in FIGS. 18 and 19. The plug-on type of circuit breaker has a spring clip type terminal assembly 210 thereon for resiliently engaging the side legs of the connectors to establish a connection thereto as seen in FIGS. 18 and 20. The other terminal of each circuit breaker is located adjacent the other end of the circuit breaker housing which overlaps the tongue walls 180 and the side rails. The other terminal is adapted to be conventionally connected to the desired circuit through wiring extended between the rails 78 and the side walls 36 of the box 16.

To assemble circuit breakers of the plug-on type to the panelboard the cutout portion 179 of each circuit breaker housing is received by the rail or bead 174 of rib 172 and then the spring clip terminal 210 is secured to the corresponding bus stab 96 or 98. The circuit breaker housing comprises two halves or portions secured to each other and overlaps only a portion of the respective connector 96 or 98 so that a second circuit breaker 30 in parallel aligned relationship and mounted on the opposite bead 174 can also be connected to the same bus stab. It will be understood that the resilient bead 174, while preferably integrally formed on the respective base, can also be a separate member attached to the bead, however since the circuit breaker housing is formed of a thermosetting plastic, the bead in each case is a thermoplastic.

The cutout portion in one housing half comprises an arcuate recess extending over an arc greater than 180° closely conforming to the dimension and shape of the bead 174 as defined by projections 211 seen in FIG. 20a. The other housing half is merely provided with a cutout large enough to accommodate the bead without interference. The projections 211 squeeze or compress the bead in passing thereover and then relieve the compression while preventing retraction or movement of the housing from the bead. By forming different sized cutouts close alignment of the cutouts in the two housing halves, when secured to each other, is avoided and the power required to engage and disengage housing and the bead is reduced.

To remove the circuit breaker of the spring clip or plug-on type such as described in the previous paragraph, upward pivoting of the breaker housing adjacent the connector 96 or 98 and about the bead 174, engages a corner of the housing overlapping the tongue wall 180 with the tongue. The leverage or moment arm then extends from the end of the housing overlapping the connector and is considerably greater than the distance between the bead 174 and tongue 180 so that a large mechanical advantage is secured in freeing the circuit breaker from the panelboard assembly.

Other types of breakers utilizing a flexible terminal strap may be assembled to the panelboard by first fastening the strap to the connector and then folding the strap beneath the housing, while engaging the bead with the housing cutout. To remove this type of breaker, a screwdriver is first inserted in a top opening of the breaker and levered against an upper corner edge of the breaker to free the same from the bead 174 as indicated by the broken lines 212 in FIG. 18. The flexible terminal may then be unfolded as shown in FIG. 19 to permit the strap to be connected from the bus stab.

The assembly 80 is usually formed at the factory by assembling the insulators 100, 86 and 88 in tandem relationship as shown, and the bars 90 and 94 secured thereto to hold the assembly together. The bent end of bar 92 is moved through passage 136 either before or after the bars 90 and 94 are assembled to the insulators, with the wrap 158 carried by the bar 92. It will be noted that the center bus bar 92 is approximately $1\frac{1}{2}''$ wide and that is opposing longitudinal edges can be spaced substantially $\frac{1}{2}''$ from an adjacent side bus bar 90 or 94, while the bus stabs 96 and 98 are spaced apart by less than $\frac{1}{2}''$ and their ends are less then 1" from an adjacent bar. The cap 164 is then assembled thereto after barrier 167 is in place. The neutral assembly 82 is completed by assembling the neutral busses 118 and 120 together with bar 122 to insulator 100 either before or after the insulators are assembled to each of the as convenient. The assembly 80 may of course be shipped with the rails 78 for facile assembly to a box 16 at the site. Alternatively the assembly 80 is assembled to a box 16 at the factory and shipped as a complete panelboard.

The foregoing constitutes a description of an improved panelboard, interior assembly and an improved circuit breaker housing, whose inventive concepts are believed set forth in the accompanying claims.

What we claim is:

1. A panelboard comprising:
a plurality of modular insulating members of thermoplastic material each having means at one end engaging another of said members to form an insulating assembly having one planar surface adapted to engage with a planar surface of a bus bar,
and a rib wall integrally formed on each member in aligned longitudinal relationship with each other rib wall in response to the engagement of said means at one end of each member to form said insulating assembly, each rib wall extending transverse to said one planar surface and having a free end with an integrally formed longitudinally extending split bead spaced from said one planar surface and adapted to secure a circuit breaker to said assembly at any one of a plurality of positions spaced longitudinally along said bead.

2. In the assembly claimed in claim 1, a plurality of tongue walls each integrally formed on a respective one of said members and projecting transversely from the respective rib wall, said tongue walls adapted to engage said circuit breaker to assist in disengaging said circuit breaker from said split bead.

3. The improvement claimed in claim 2 in which said split bead on each member has two spaced portions movable relative each other with an arcuate periphery on each portion adapted to fit a correspondingly shaped and dimensioned portion of a recess in the housing of said circuit breaker.

4. A panelboard assembly supporting a circuit breaker in a cabinet having a metal back wall, the improvement comprising:

a pair of spaced elongate parallel rail members, an insulating assembly formed of thermosplastic material bridging the space between said rail members and secured to each rail member, coincident planar surface areas on said insulating assembly spaced apart by thermoplastic material having a thickness of less than 0.125 inches, and a plurality of spaced apart, elongate, parallel bus bars having a generally rectangular cross section, said bus bars being located between said rail members and extending parallel to said rail members with each bar adapted to carry electrical alternating current of at least 200 amps and at least 110 RMS volts and having a planar surface area in contiguous engagement with a respective planar surface area of said insulating assembly, each planar surface area on said insulating assembly opposite the surface area contiguously engaged by said bus bar planar surface area being directly engaged with said metal back wall whereby heat transfer is provided between each of said bus bars and said metal back wall in response to the passage of current in a respective one of said bus bars.

5. In the assembly claimed in claim 4, another bus bar located between and extending parallel to said rail members, said other bus bar located between a portion of said insulating assembly and said back metal wall, said insulating assembly having an access passageway, an insulating cap interposed between said other bus bar and said back metal wall, and a branch connector extending through said passageway connecting said other bus bar to said circuit breaker.

6. The assembly claimed in claim 4 in which said insulating assembly comprises a plurality of modular insulators each having a pair of spaced intergrally formed coplanar walls located adjacent a respective rail member and in aligned longitudinal relationship with a respective planar wall of each other member, each planar wall having a reduced end section complementary to a reduced end section formed on the end of another planar wall and nestingly engaged therewith, each planar wall having a portion overlapping an adjacent rail member, and a resilient bead integrally formed with each planar wall, spaced from each planar wall and adapted to secure said circuit breaker to said insulating assembly.

7. In the assembly claimed in claim 6, said circuit breaker being secured to said bead, and an integrally formed tongue on each planar wall portion projecting in one direction past an adjacent rail member edge and located intermediate an end of said circuit breaker and said rail member and adapted to engage a portion of said circuit breaker in response to rotation of said circuit breaker secured to said bead about the elongate axis of said bead to assist in disengaging said circuit breaker from said bead.

8. In the panelboard assembly claimed in claim 4, a platform wall adjacent one end of said assembly, means for attaching each of said bus bars to said platform wall, and means integrally formed with said platform wall adapted to support a neutral assembly in alignment with each rail member.

9. In the assembly claimed in claim 6, a circuit breaker housing with a bottom wall having an arcuate recess therein in engagement with said bead securing said circuit breaker housing to said insulating assembly.

10. A mounting pan assembly including a bus bar and a circuit breaker having an insulating housing with a bottom wall of said housing having a recess, the improvement comprising:

a thermoplastic insulating member insulating said bus bar and having an electrically insulating longitudinally extending resilient bead of thermoplastic material thereon, said bead engaged with said recess in the bottom wall of said circuit breaker housing detachably securing said circuit breaker housing to said member.

11. The assembly claimed in claim 10 in which said bead comprises two portions, each having an arcuate surface formed about a pivot axis, said bead engaging a surface of said recess to enable said breaker housing to pivot about an axis of said arcuate surfaces, said housing also having projections in said recess in close fitting relationship with said bead portions which, and engaging a portion of said housing in response to the pivoting movement of said housing, facilitate the movement of said portions toward each other to separate said circuit breaker housing from said bead.

12. A circuit breaker and panelboard assembly including an insulator, a plurality of circuit breakers, a plurality of parallel bus bars connected to the terminal of a respective one of said circuit breakers and secured to said insulator, and a resilient bead of insulating material on said insulator securing said circuit breaker to said insulator, said bead extending parallel to said bus bars, the improvement comprising:

one housing portion on each circuit breaker having a bottom wall with a first recess deformingly engaging said resilient bead on said insulator to secure said housing portion to said insulator.

13. In the improvement claimed in claim 12, a second housing portion on each circuit breaker secured to said one housing portion to form a housing for each circuit breaker with said second housing portion having a bottom wall with a larger recess than said first recess and aligned with said first recess and receiving said resilient bead.

14. In a panelboard assembly including metal support means, the improvement comprising:

a pair of parallel bus bars each having a planar surface and adapted to carry electrical current at a minimum of 110 volts, a first wall of thermoplastic material interposed between each bus bar planar surface and said metal support means and engaged with each bus bar planar surface and said metal support means, said wall having a thickness less than 0.125 inches between each bus bar and said metal support means for transmitting heat between each bus bar and said metal support means, a plurality of branch connectors each connected to a respective one of each of said bus bars, means on said other wall supporting each branch connector on said other wall and providing a tortous elongate surface path between each branch connector to prevent electrical leakage therebetween, a pair of spaced apart circuit breaker mounting ribs extending parallel to each bus bar and formed of thermoplastic material with each rib adapted to engage a circuit breaker housing overlapping one of said bus bars, said bus bars located intermediate said pair of ribs, and said ribs being integrally formed on said first wall and extending therefrom in one direction, each rib including a longitudinally split portion at one end of each rib spaced from said wall.

* * * * *